Patented Jan. 13, 1953

2,625,539

UNITED STATES PATENT OFFICE 2,625,539

HOMOPOLYMERIZATION OF VINYL CHLORIDE IN AQUEOUS MEDIUM

Vernon L. Folt, Akron, Ohio, assignor to The B. F. Goodrich Company, New York, N. Y., a corporation of New York No Drawing. Application June 2, 1949, Serial No. 96,816

4 Claims. (Cl. 260—92.8)

This invention relates to the polymerization of vinyl chloride in an aqueous medium free of emulsifying and dispersing agents, and more particularly to the use in such polymerization of a catalyst-activator combination comprising a peroxygen compound and an ionizable silver compound.

It is well known that vinyl chloride can be polymerized in an aqueous medium in the presence of catalysts, activators, emulsifiers, buffers, modifiers, and the like. However, many of the known methods of polymerization involving the use, as catalyst, of a peroxygen compound such as benzoyl peroxide, hydrogen peroxide, caprylyl peroxide, or a persulfate, percarbonate, perborate or perphosphate, suffer from the disadvantage that the reaction does not start immediately, but rather exhibits an "induction period" or period of inhibition during which time the factors favoring polymerization are not present, or during which time certain chemical and physical changes are going on, the build-up of which later results in polymerization. The above-described "induction period" is undesirable because it greatly lengthens time to completion of the polymerization reaction and thereby reduces equipment capacity; moreover, the "induction period" makes impracticable the polymerization of monomeric material in a continuous manner. It is known that the "induction period" may be reduced by increasing the catalyst concentration and/or by carrying out polymerization at higher than normal temperatures. However, increasing the concentration of a "peroxygen" catalyst or increasing the reaction temperature usually results in polymers of lower molecular weight, which are undesirable for commercial utilization.

In the copending applications of Grant W. Smith, Serial Nos. 779,412 and 779,413, filed October 11, 1947, now, respectively, United States Patents Nos. 2,473,548 and 2,473,549, it is disclosed that monomeric vinylidene compounds, including vinyl chloride, can be polymerized in aqueous medium, with reduction of the induction period, by use of catalyst-activator combinations including a peroxygen compound, an ionizable silver compound, and a third component which is either ammonia or an ionizable oxylate. In another copending application of Grant W. Smith, Serial No. 779,414, also filed October 11, 1947, now Patent No. 2,510,426, it is further disclosed that monomeric mixtures comprising vinyl chloride and a copolymerizable monomer can be polymerized in an aqueous medium at increased rate by use of a catalyst activator combination consisting of only two components, a peroxygen compound and an ionizable silver compound. It was found, however, that the combination consisting of peroxygen compound and ionizable silver compound is completely ineffective in accelerating the polymerization of vinyl chloride alone in an aqueous emulsion containing an added emulsifying, dispersing or surface active agent.

I have now discovered that vinyl chloride alone can be polymerized in a rapid manner and in a very short total reaction time by carrying out the polymerization in an aqueous medium containing only the monomeric vinyl chloride, water and a small amount of a polymerization catalyst-activator combination consisting of a peroxygen compound, preferably a water-soluble persulfate such as sodium, potassium or ammonium persulfate and an ionizable silver compound such as silver nitrate or silver acetate. This discovery is quite surprising since, as noted above, the combination of a persulfate and silver compound will not polymerize vinyl chloride alone when emulsifying, dispersing or other surface active agents are added to the aqueous medium.

By the use of the silver-peroxygen combination the "induction period" in the polymerization of vinyl chloride is reduced by 50 to 75% or more, or entirely eliminated in many instances. When using this catalyst-activator combination, the reaction temperature is not critical and may vary widely from as low as 0° C. or lower to as high as 100° C., or higher; generally, however, polymerization of vinyl chloride, according to this invention, is effected at 20 to 60° C. At temperatures of 30 to 50° C., for example, the silver peroxygen combination used in a system containing only the catalyst-activator combination, vinyl chloride and water can polymerize the vinyl chloride to a yield of 90 to 95% or more of polymer in as little as two hours.

The amount of peroxygen catalyst necessary in order to obtain rapid polymerization in the method of this invention is not critical, but may vary widely from as little as .1% to as much as 1% or even as much as 5% (all percentages being based on the amount of vinyl chloride monomer). When using a water-soluble persulfate, as is preferred, it has been found that increases in concentration within the range of 0.1 to 1% produce corresponding increases in the rate of polymerization. For this reason and in order to avoid use of more persulfate than needed, amounts of 0.2 to 0.70% based on the monomers of sodium, potassium or ammonium persulfate, is preferred and is sufficient to produce very fast reaction rates, when used with the proper concentration of silver, as will be explained below.

When polymerizing vinyl chloride alone in an aqueous medium in the presence of a silver peroxygen combination (and in the absence of added surface-active materials), the concentration of silver ion is critical. No reaction is observed with extremely low silver concentration and polymerization does not proceed unless at least 100 parts per million or 0.01% (expressed as silver nitrate and based on the vinyl chloride monomer) of an ionizable silver compound is present. Satisfactory activation is first observed between 200 and 300 parts of silver nitrate (or its equivalent) per million; as the amount of silver nitrate is increased, both reaction rate and yield of polymer increase rapidly. When concentrations of silver nitrate between 1,000 to 3,500 parts per million are used, yields of polymer of 90% or over are obtained within two hours. Increasing the silver nitrate commencements from 3,500 parts per million up to about 5,000 parts per million rapidly reduces the yield of polymer although the reaction is still faster than a control, and at concentrations of 10,000 parts per million, the reaction is definitely inhibited. In general, therefore, concentrations of silver from 100 to 5,000 parts per million, or 0.01 to 0.5% (as silver nitrate based on the vinyl chloride monomer) are operative but concentrations in the range of 0.04 to 0.4% are definitely preferred.

The above concentrations are based on the addition of silver nitrate to the aqueous medium either before or after addition of the vinyl chloride. This, however, is not the only method of adding silver ions to the reaction mixture since such ions are formed by adding other water-soluble or sparingly soluble silver compounds such as silver sulfate, silver acetate, silver chlorate or silver lactate, to the reaction mixture, together with the preferred potassium, sodium or ammonium persulfate catalysts whereupon the sparingly soluble silver compound will dissolve in the persulfate solution with the formation of free silver ions. In addition, the silver persulfate solution may be formed outside the reaction medium and added as such thereto. In any event, whichever method of producing silver ion is adopted, it has been found that the nature of the anion is not critical for the silver ion has been found to be the activating agency. In all these alternative methods, the concentration of silver which should be used is that which is chemically equivalent to the amounts of silver nitrate set out above.

Polymerization of vinyl chloride in an aqueous medium containing the silver-peroxygen combination of this invention proceeds only in the absence of added emulsifying and dispersing agents, and proceeds satisfactorily in the absence of all other catalysts, buffers, and similar substances. Polymerization first commences with the formation of a true dispersion of polymer and water, and as polymerization progresses the dispersed particles increase in size without initiation of new particles. When polymerization progresses to a critical point, somewhere in the range of 30 to 50% conversion, the dispersion breaks and phase inversion occurs with the formation of a slurry of polymer in water. Thereafter, polymerization progresses apparently on or in the already formed particles, such that the end result is a fine, but filterable slurry of polymer. The dispersion of polymer noted above in the early stages of polymerization is believed to be the result of an initiation reaction between the persulfate and vinyl chloride forming free radicals which act as an emulsifier in the early stages of the polymerization. The latter reaction is believed to slow down or be insufficient in the latter stages of the reaction with the result that the dispersion breaks with the formation of the aqueous slurry.

It is preferred in the practice of this invention that the amount of water used be from one to six times or more that of the monomeric material, and that the reaction mixture be agitated constantly during the reaction so as to insure efficient distribution of the monomers through the mixture.

The polymerization is preferably carried out in an inert atmosphere, in the substantial absence of gaseous or molecular oxygen for it has been observed that the presence of molecular oxygen will cause an appreciable "induction period" or lag in the commencement of polymerization. Accordingly, it is preferred that oxygen free vinyl chloride be used and that it be stored under an inert atmosphere such as nitrogen before charging to the reaction mixture. If the polymerization is effected continuously in a pipe line, appropriate precautions are preferably taken to exclude oxygen from the reaction mixture.

The new catalyst activator combination of this invention may be employed in conjunction with other polymerization expedients provided that no surface-active materials are introduced. For example, water-soluble buffer salts such as sodium bicarbonate may be added to the reaction mixture. As other expedients, the entire amount of vinyl chloride is not added to the reaction mixture, but is added in increments or at a uniform rate over the entire reaction period. Moreover, the catalysts and silver activator may be added gradually or in increments during the progress of the polymerization. Addition of the silver activator in a gradual manner may be effected by coating the silver or silver compounds with collodian or depositing it on silica gel so as to permit gradual diffusion of silver during the course of the reaction.

Still another expedient found to result in smoother and more satisfactory reaction (particularly if the reaction is carried out so as to be complete in from two to six hours or less) is to withhold a portion of the peroxygen catalyst, adding a portion only to the reaction mixture at the start and adding the remainder to the reaction vessel in increments or continuously over the entire reaction period. Incremental additions of potassium persulfate to a silver activated vinyl chloride polymerization has still another advantage for it has been found that each addition of the catalyst causes a new set of particles to be initiated which particles subsequently increase in size at the same rate along with those formed at the start of the reaction. By injecting the persulfate at the correct intervals during the reaction, it is possible to produce a final slurry having a predetermined particle size range. In the preparation of polyvinyl chloride spreading pastes (polyvinyl chloride suspended in an oily plasticizer) the above-described technique makes possible the production of a polymer which will have the desired paste viscosity. Continuous addition of persulfate has the additional advantage of requiring slightly less persulfate than batch-charging methods, and a smoother, more easily controlled reaction results.

The invention will be further described by the following specific examples, which are intended to be merely illustrative of the invention and not a limitation thereof.

Examples 1-11

To show the effect of the catalyst activator of this invention, polymerization of vinyl chloride was performed by sealing several portions of various reaction mixtures in glass tubes under a nitrogen atmosphere and placing the tubes in a rotating rack within a constant temperature bath maintained at 35° C. The reaction mixtures were made up of the following materials in the following proportions, in which parts are by weight:

| Materials: | Parts by weight |
|---|---|
| Vinyl chloride | 100 |
| Water | 400 |
| Potassium persulfate | 0.50 |
| Silver nitrate | Variable |

Polymerization of vinyl chloride in all tubes containing silver nitrate started almost immediately, none of these polymerizations exhibiting an appreciable "induction period," but a control tube containing no silver nitrate exhibited an appreciable "induction period" of from two to four hours before the first evidence of polymerization was noted therein. The results obtained in the various tubes are listed below, in which the concentration of silver and the yield of polyvinyl chloride in two hours at 35° C. are shown:

| Example | Concentration of Silver Nitrate in P. P. M. of Vinyl Chloride | Yield in 2 Hrs. at 35° C. |
|---|---|---|
| Control | 0 | No polymerization. |
| 1 | 100 | 2% or less. |
| 2 | 200 | 7%. |
| 3 | 300 | 17%. |
| 4 | 400 | 59.5%. |
| 5 | 600 | 82%. |
| 6 | 800 | 86%. |
| 7 | 1,200 | 89%. |
| 8 | 3,000 | 93%. |
| 9 | 3,500 | 90%. |
| 10 | 4,000 | 51%. |
| 11 | 5,000 | Less than 1%. |

It will be noted that a very fast polymerization results from the use of as low as 400 parts per million of silver nitrate and as much as 4,000 parts per million. Polymerization proceeds, however, at a silver nitrate concentration as low as 100 p. p. m. and as high as 5,000 p. p. m. whereas no polymerization occurred in 2 hrs. time in the absence of silver nitrate.

The polymers secured in Examples 1-10 above were in every way comparable as regards their physical properties and chemical stability to ordinary polyvinyl chloride which is conventionally prepared by polymerization in aqueous emulsion using an emulsifying agent and a peroxygen catalyst. Such polymerization in aqueous emulsion usually requires from 16 to 32 hours. In fact, the polyvinyl chloride prepared by the method of this invention contains smaller amounts of electrolytic residues (which usually contribute to polymer breakdown and poor polymer properties) than ordinary polyvinyl chloride, and is a higher molecular weight material as is evidenced by the specific viscosity of the above polymers ranging from 0.60 to 1.16. Ordinary polyvinyl chloride possesses a specific viscosity of from 0.50 to 0.60.

Results substantially equivalent to those described in Examples 1 to 10 are secured when using other silver compounds which are soluble in the reaction mixture to give silver ions, in concentrations chemically equivalent to the concentration of silver nitrate. When the examples are repeated except that a water-soluble buffer such as sodium bicarbonate is also employed, the reaction is substantially as fast as in the absence of the buffer. When the water-soluble persulfate is replaced by another peroxygen compound, either water-soluble such as sodium perborate or hydrogen peroxide or water-insoluble such as benzoyl peroxide, polymerization proceeds more rapidly because of the presence of the silver compound, but the rate of reaction is not nearly so great as when using a water-soluble persulfate.

My copending application Serial No. 96,815 filed May 26, 1949, now abandoned, discloses the polymerization of vinyl chloride in the presence only of water and a water-soluble persulfate, no emulsifying, dispersing or surface-active agent being present. It is to be noted, however, that the invention of this application represents an improvement over that of my copending application since, as shown by the above examples and their comparison with the control, the "induction period" is much less and the reaction much faster in the presence of water, persulfate and silver nitrate than in the presence only of water and persulfate.

While there has been disclosed with considerable detail certain preferred manners of performing this invention, it is not intended or desired to be solely limited thereto for as hitherto stated, the procedure may be modified, the precise proportions of the materials utilized may be varied, and other materials having equivalent properties may be employed, if desired, without departing from the spirit and scope of the invention, as defined in the appended claims.

I claim:

1. The method which comprises preparing an aqueous medium containing only monomeric vinyl chloride, water and a catalyst-activator combination consisting of a peroxygen compound and a material ionizable to yield silver ion and selected from the class consisting of silver nitrate, silver sulfate, silver acetate, silver chlorate, and silver lactate, said latter material being present in an amount sufficient to provide a concentration of silver ions equivalent to that produced by a concentration of silver nitrate in the range of 0.04 to 0.4% by weight based on the vinyl chloride, and agitating said aqueous medium at a temperature of 0 to 100° C. to effect polymerization of the vinyl chloride.

2. The method which comprises preparing an aqueous medium containing only monomeric vinyl chloride, water, a water-soluble persulfate and silver nitrate, the concentration of silver nitrate being from 0.04 to 0.4% by weight based on the vinyl chloride, and agitating said aqueous medium at a temperature of 0 to 100° C. to effect polymerization of the vinyl chloride.

3. The method of claim 1 further characterized in that a water-soluble buffer salt is present in the aqueous medium.

4. The method of claim 2 further characterized in that sodium bicarbonate is present in the aqueous medium.

VERNON L. FOLT.

REFERENCES CITED

The following references are of record in the file of this patent:

UNITED STATES PATENTS

| Number | Name | Date |
|---|---|---|
| 2,419,090 | Rainard | Apr. 15, 1947 |
| 2,473,548 | Smith | June 21, 1949 |
| 2,473,549 | Smith | June 21, 1949 |